United States Patent [19]

Abe

[11] Patent Number: 5,285,275
[45] Date of Patent: Feb. 8, 1994

[54] DECODING METHOD OF PICTURE IMAGE DATA AND DECODING CIRCUIT THEREFORE

[75] Inventor: Tomomi Abe, Tokyo, Japan
[73] Assignee: Sony Corporation, Tokyo, Japan
[21] Appl. No.: 857,630
[22] Filed: Mar. 25, 1992
[30] Foreign Application Priority Data
  Mar. 25, 1991 [JP] Japan ............... 3-084626
[51] Int. Cl.⁵ .............................. H04N 7/13
[52] U.S. Cl. ...................... 348/384; 348/472
[58] Field of Search .................. 358/13, 133; 340/703 DL; H04N 7/13

[56] References Cited

U.S. PATENT DOCUMENTS

| | | | |
|---|---|---|---|
| 4,804,948 | 2/1989 | Nishi | 340/703 DL |
| 4,896,146 | 1/1990 | Narumiya | 340/703 DL |
| 5,065,144 | 11/1991 | Edelson | 340/703 DL |
| 5,172,228 | 12/1992 | Israelsen | 358/133 |

Primary Examiner—Howard W. Britton
Attorney, Agent, or Firm—Hill, Steadman & Simpson

[57] ABSTRACT

A method of and a circuit for decoding compressed picture image data wherein compressed picture image data of a variable length can be decoded at a fixed high rate. A buffer memory into which compressed picture image data are to be written has a capacity greater than an amount of object compressed picture image data for one frame. Before compressed picture image data are written into the buffer memory, it is checked as to whether or not the buffer memory has an empty space into which such compressed picture image data for one frame can be written. When the checking proves that the buffer memory has such empty space, the compressed picture image data are written into the buffer memory, but on the contrary if the buffer memory has no such empty space, the picture image data are abandoned and not written into the buffer memory.

4 Claims, 12 Drawing Sheets

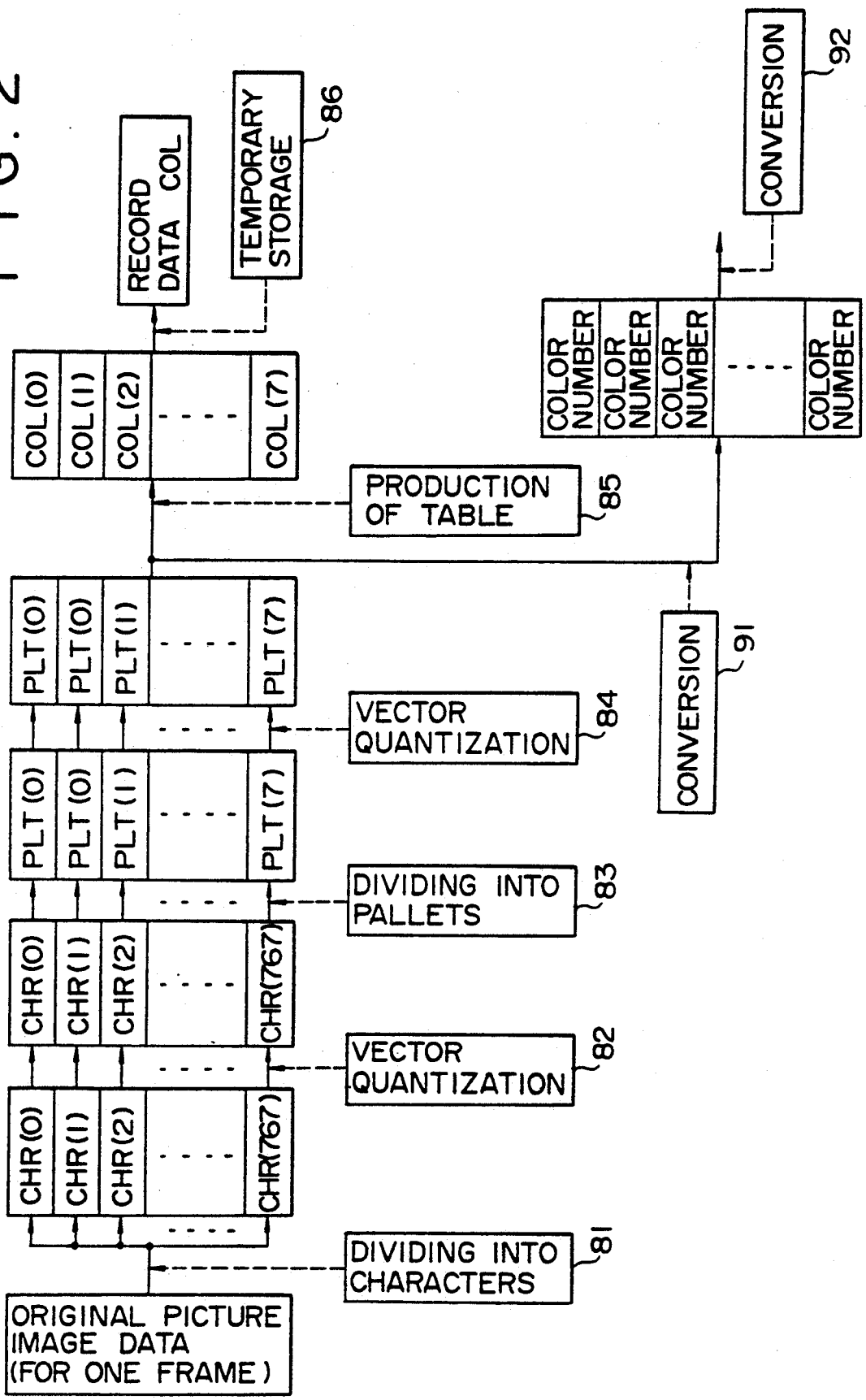

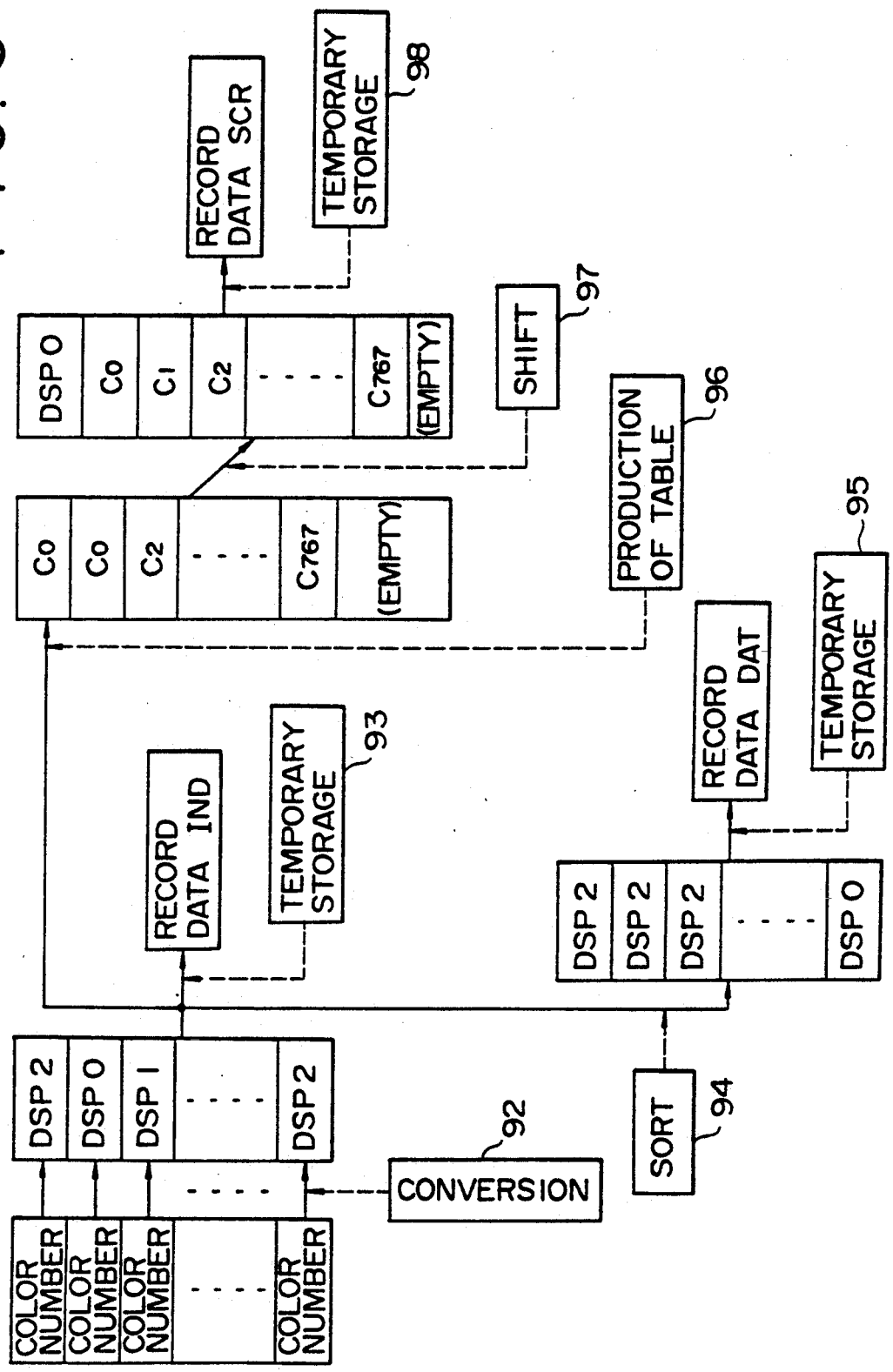

FIG. 5

| COLOR NUMBER | 0 | 1 | 2 | - - - - - - | 7 |
|---|---|---|---|---|---|
| DATA OF 0TH PALLET | COLOR DATA (15 BITS) | COLOR DATA | COLOR DATA | - - - - - - | COLOR DATA |

COLOR NUMBER TABLE COL(0)

| COLOR NUMBER | 0 | 1 | 2 | - - - - - - | 7 |
|---|---|---|---|---|---|
| DATA OF 1ST PALLET | COLOR DATA | COLOR DATA | COLOR DATA | - - - - - - | COLOR DATA |

COLOR NUMBER TABLE COL(1)

⋮

| COLOR NUMBER | 0 | 1 | 2 | - - - - - - | 7 |
|---|---|---|---|---|---|
| DATA OF 7TH PALLET | COLOR DATA | COLOR DATA | COLOR DATA | - - - - - - | COLOR DATA |

COLOR NUMBER TABLE COL(7)

FIG. 6C

INDEX NUMBER DATA DSP2

| 1 | 1 | ---- | 3 |
| 1 | 0 | | 3 |
| : | | | : |
| 2 | 2 | ---- | 2 |

INDEX NUMBER

FIG. 6B

INDEX TABLE IND2

| 0 | 1 | 2 | 3 | ← INDEX NUMBER
| 0 | 3 | 6 | 15 |
                ↑ COLOR NUMBER

FIG. 6A

CHARACTERS MCH2 OF 2-BIT MODE (PICTURE IMAGE DATA CHR(i))

COLOR NUMBER

| 3 | 3 | ---- | 15 |
| 3 | 0 | | 15 |
| : | | | : |
| 6 | 6 | ---- | 6 |

← 8 PICTURE ELEMENTS →
↕ 8 PICTURE ELEMENTS

FIG. 7C

INDEX NUMBER DATA DSPI

INDEX NUMBER

FIG. 7B

INDEX NUMBER

INDEX TABLE INDI

COLOR NUMBER

FIG. 7A

COLOR NUMBER

CHARACTERS MCHI OF 1-BIT MODE (PICTURE IMAGE DATA CHR(i))

8 PICTURE ELEMENTS

8 PICTURE ELEMENTS

CHARACTERS MCH0 OF SINGLE COLOR MODE (PICTURE IMAGE DATA CHR(i))

DECODING METHOD OF PICTURE IMAGE DATA AND DECODING CIRCUIT THEREFORE

BACKGROUND OF THE INVENTION

1. Field of the Invention

This invention relates to a method of and a circuit for decoding compressed picture image data.

2. Description of the Prior Art

A CD-ROM (compact disk read-only memory) is known as a storage medium of a large capacity and is used as an external storage medium for game machines employing a microcomputer, personal computers and so forth.

FIG. 1 shows an exemplary one of conventional microcomputer systems in which a CD-ROM can be used.

Referring to FIG. 1, the microcomputer system shown is applied to a game machine and includes a game machine body 1, a sub-processing section 3 for a CD-ROM 4, and a program cartridge 5.

The game machine body 1 includes a microcomputer including a CPU (central processing unit) 11, a main RAM (random access memory) 13 serving as a working area for the CPU 11, a PPU (picture processing unit) 14 and a video RAM 15. The circuits 11, 13 and 14 are connected to a system bus 19, and the video RAM 15 and a CRT (cathode ray tube) 6 are connected to the PPU 14.

The game machine body 1 further includes a main processing section 20 for audio data including an APU (audio processing unit) 21 and a D/A (digital to analog) converter 24 and having an audio output terminal 25 connected to the D/A converter 24. The APU 21 is connected to the bus 19 and also to the D/A converter 24.

Meanwhile, the sub-processing section 3 is provided in order to make use of a CD-ROM 4 possible and includes a CD player, a CD-ROM decoder and so forth not shown. Thus, picture image data and programs read out from the CD-ROM 4 are processed suitably by the sub-processing section 3 and forwarded into the bus 19.

The program cartridge 5 includes a ROM 51 and a RAM 52. The ROM 51 has required programs stored in advance therein, and the RAM 52 is used, for example, when a game being played is interrupted temporarily, to maintain various data regarding conditions of the game then until the game is resumed later. Thus, the RAM 52 is backed up by a battery 53.

When the cartridge 5 is inserted into a slot 2 of the game machine body 1, the ROM 51 and the RAM 52 thereof are connected to the bus 19 by way of a connector not shown.

In case a game can be played only with the program cartridge 5, after the cartridge 5 is set in position into the slot 2, either the power supply to the game machine body 1 is made available or the game machine body 1 is reset.

Consequently, a program of the ROM 51 is executed by the CPU 11 so that picture image data are formed and written into the video RAM 15 by the PPU 14, and the picture image data of the video RAM 15 are read out in synchronism with horizontal and vertical scanning and supplied to the display 6 so that a picture image is displayed on the display 6.

Further, audio data and a program for decoding such audio data are loaded into the APU 21 by the CPU 11, and the audio data are decoded into a digital audio signal by the APU 21. The digital audio signal is D/A converted into an analog audio signal by the D/A converter 24 and then outputted by way of the terminal 25.

On the other hand, when a game or the like is to be executed using a CD-ROM 4, the CD-ROM 4 will be set in position into the CD player of the sub-processing section 3 while a system cartridge is set as the program cartridge 5 in position into the slot 2.

In this instance, also such system cartridge 5 includes a ROM 51 and a RAM 52. The ROM 51 has an IPL program prepared in advance therein, and the RAM 52 is used, for example, when a game being played is interrupted temporarily, to maintain various data until the game is resumed later. Meanwhile, the CD-ROM has prepared therein an OS (operating system) for using the CD-ROM 4 and various programs for the game.

Thus, after the power supply is made available, the CPU 11 executes the IPL program of the ROM 51 so that the OS and a necessary program of the game are loaded from the CD-ROM 4 into the RAM 13, and then the CPU 11 executes the program loaded in the RAM 13. Consequently, the game can be played with the game machine.

By the way, if it is assumed, for example, that one frame (one screen) of a picture image displayed on the display 6 is constituted from 256 picture elements (horizontal) × 192 picture elements (vertical) and red, green and blue colors of each picture element are individually represented by 5 bits, then the amount of picture image data of one frame is given by $$256 \text{ picture elements} \times 192 \text{ picture elements} \times 3 \text{ colors} \times 5 \text{ bits} = 737{,}280 \text{ bits}$$
$$= 90 \text{ kilobytes}$$

Meanwhile, the capacity of one sector of the CD-ROM 4 is, in the mode 1 as defined in the specified CD-ROM format, 2 kilobytes and the reproducing rate is 75 sectors/second. In other words, the data transmission rate of the CD-ROM 4 is 150 kilobytes/second.

Accordingly, if those picture image data are recorded as they are onto the CD-ROM 4, then the number of frames per second upon reproduction is 150 kilobytes/90 kilobytes = 1.7 frames or less and accordingly, even if it is tried to display an animation, the number of frames will come quite short.

Therefore, in order to display an animation, picture image data of the animation must necessarily be recorded in a compressed form onto the CD-ROM 4 to assure a sufficient number of frames per second.

In case picture image data are recorded in a compressed form in this manner, such processing steps as follows are required in order to display an animation of the picture image data:

I. to reproduce the thus compressed picture image data from the CD-ROM;

II. to write the thus reproduced picture image data once into a buffer memory; and III. to decode the picture image data in the buffer memory back into original picture image data.

However, when such reproducing processing is executed, if the decoding rate in the paragraph III is lower than the reproducing rate in the paragraph I, then the buffer memory in the paragraph II will overflow.

In this instance, if the buffer memory has a large capacity equal to the capacity of the CD-ROM 4 or so, then no overflow of the buffer memory will occur. However, a buffer memory of such a great capacity is very expensive. Further, since the number of frames per second of a picture image (animation) to be displayed on the display 6 depends upon the decoding rate in the paragraph III, the reproducing rate of the picture image is varied by a performance of the decoding circuit.

Further, even if a decoding circuit of a sufficient performance is used, when the amount of compressed picture image data is varied by contents of a picture image, that is, when the compressed picture image data have a variable length, the time required for decoding of the picture image data is varied by contents of the picture image. Accordingly, a programmer who tries to produce an application program of a game must necessarily program taking a time necessary for decoding of the program into consideration, which is a burden to the programmer.

SUMMARY OF THE INVENTION

It is an object of the present invention to provide a method of and a circuit for decoding compressed picture image data wherein compressed picture image data of a variable length can be decoded at a fixed high rate.

In order to attain the object, according to an aspect of the present invention, there is provided a method of decoding input compressed picture image data, which comprises the steps of receiving input compressed picture image data, checking whether or not a buffer memory having a capacity greater than an amount of such input compressed picture image data for one frame has an empty space into which such input compressed picture image data for one frame can be written, writing, when the checking proves that the buffer memory has such empty space, the input compressed picture image data for one frame into the buffer memory, and decoding the picture image data in the buffer memory into original picture image data, but abandoning, when the checking proves that the buffer memory has no such empty space, the input compressed picture image data for one frame.

According to another aspect of the present invention, there is provided a method of decoding compressed picture image data, which comprises the steps of reproducing compressed picture image data from a CD-ROM, checking whether or not a buffer memory having a capacity greater than an amount of such compressed picture image data from the CD-ROM for one frame has an empty space into which such compressed picture image data from the CD-ROM for one frame can be written, writing, when the checking proves that the buffer memory has such empty space, the compressed picture image data from the CD-ROM for one frame into the buffer memory, and decoding the picture image data in the buffer memory into original picture image data, but abandoning, when the checking proves that the buffer memory has no such empty space, the compressed picture image data from the CD-ROM for one frame.

According to a further aspect of the present invention, there is provided a decoder circuit for decoding compressed picture image data into original picture image data before compression, which comprises a buffer memory having a capacity greater than an amount of predetermined input compressed picture image data for one frame, checking means for checking whether or not the buffer memory has an empty space into which such input compressed picture image data for one frame can be written, controlling means for writing, when the checking means determines that the buffer memory has such empty space, the input compressed picture image data for one frame into the buffer memory, but abandoning, when the checking means determines that the buffer memory has no such empty space, the input compressed picture image data for one frame, and decoding means for decoding the picture image data in the buffer memory into original picture image data.

According to a still further aspect of the present invention, there is provided a decoder circuit for decoding compressed picture image data into original picture image data before compression, which comprises means for reproducing compressed picture image data from a CD-ROM, a buffer memory having a capacity greater than an amount of such compressed picture image data for one frame, checking means for checking whether or not the buffer memory has an empty space into which such compressed picture image data from the reproducing means for one frame can be written, controlling means for writing, when the checking means determines that the buffer memory has such empty space, the compressed picture image data from the reproducing means for one frame into the buffer memory, but abandoning, when the checking means determines that the buffer memory has no such empty space, the input compressed picture image data from the reproducing means for one frame, and decoding means for decoding the picture image data in the buffer memory into original picture image data.

With the decoding methods and decoder circuits, when picture image data, which may be reproduced from a CD-ROM, are to be written into the buffer memory, it is first checked whether or not the buffer memory has an empty space into which such picture image data for one frame can be written, and if the buffer memory has such empty space, then the picture image data are written into the buffer memory, but on the contrary if the buffer memory has no such empty space, the picture image data are abandoned and not written into the buffer memory. Consequently, even if the decoding rate, which is executed by the decoding means, is lower than the reproducing rate of picture image data which may be reproduced from the CD-ROM, the buffer memory will not overflow and the picture image data can be decoded correctly back into original picture image data. Besides, in this instance, since the buffer memory must only have a capacity for compressed picture image data for a plurality frames, a buffer memory of a low cost can be used as the buffer memory.

Further, since the number of frames per second of an animation which may be displayed on a display depends upon the reproducing rate of picture image data from the CD-ROM, the reproducing rate of an animation will not be varied by a performance of the decoder circuit.

Furthermore, since it is checked, when it is to be checked whether or not the buffer memory has an empty space into which new picture image data RECD can be written, whether or not the buffer memory has an empty space for one frame, processing is simple.

In addition, compressed picture data have a variable length and the time required for decoding of the picture image data is varied by contents of a picture image, but a programmer need not program taking such time required for decoding into consideration, and accordingly, the burden to the programmer is reduced.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a flow diagram showing part of an exemplary flow of operations in a process of compressing picture image data;

FIG. 3 is a similar view but showing the remaining part of the flow of operations;

FIG. 5 is a diagrammatic view showing color number tables;

FIGS. 6A to 6C are diagrammatic views showing different data of characters in a 2-bit mode;

FIGS. 7A to 7C are diagrammatic views showing different data of characters in a 1-bit mode;

DETAILED DESCRIPTION OF THE PREFERRED EMBODIMENT

Compressing Method of Picture Data

A compressing method of picture image data to which the present invention is applied will first be described with reference to FIGS. 2 to 11.

Figure 4A:
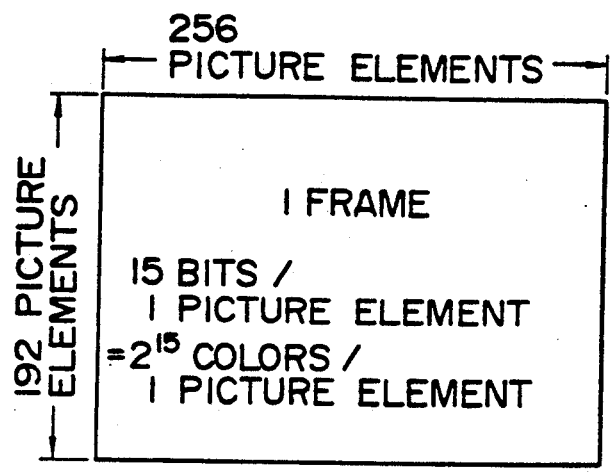
FIGS. 4A to 4C are diagrammatic views illustrating different terms regarding picture image data.
Figure 4B:
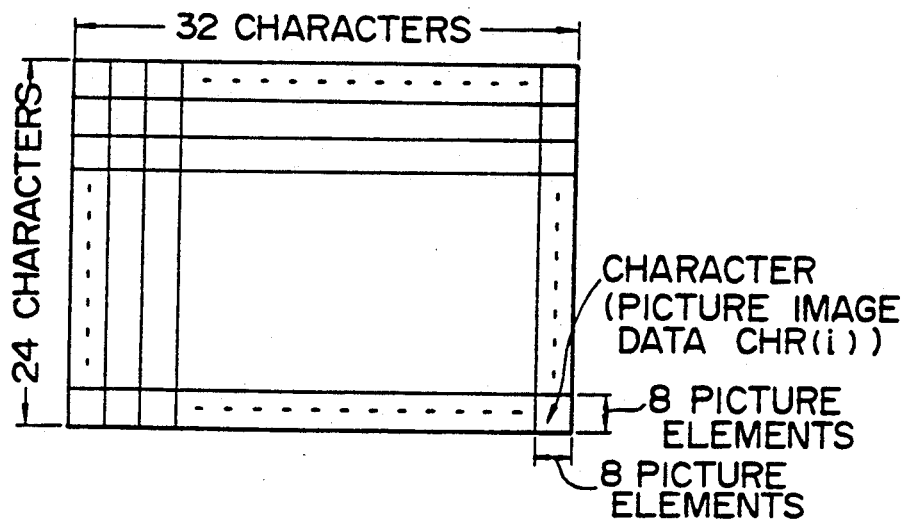

Different steps of the process of compressing picture image data are shown in FIGS. 2 and 3 while one frame (a screen) of data which makes a target for data compression is shown in FIG. 4A. Such one frame is constituted from 256 picture elements (horizontal) × 192 picture elements (vertical) and, red, green and blue colors of each picture element are each represented by 5 bits. It is to be noted that one dummy bit is added to the most significant bit for the convenience of processing. Consequently, one picture element is constituted from 1 bit (dummy)+5 bits×3 colors, that is, a total of 16 bits. Further, such original picture image data are compressed in a unit of a frame.

In particular, at step 81 shown in FIG. 2, original picture image data of such one frame as shown in FIG. 4A are divided into blocks (hereinafter referred to as "characters") of a size of 8 picture elements (horizontal) and 8 picture elements (vertical). Consequently, a picture image of one frame is divided into 32×24=768 characters and original picture image data are divided into picture image data CHR(0) to CHR(767).

Then at step 82 shown in FIG. 2, primary vector quantization of such picture image data CHR(i) (i=0 to 767) is performed. Such vector quantization involves data compression of each character such that the number of colors of picture elements in the character may be equal to or smaller than 4.

While any of various methods proposed till then may be adopted as a method for such vector quantization, in the present picture image data compressing method, a three-dimensional color space is presumed wherein color components of red, blue and green are taken on the three mutually orthogonal axes of coordinate, and distances between picture elements are found and those picture elements between which such distance is comparatively small are collected to round the picture element data so that the number of colors of the picture elements in the character may be included in "representative colors" equal to or smaller than four colors.

Further, upon such quantization, when a maximum value among quantization errors of each character of each frame (such quantization errors correspond to distances between representative colors and colors of individual picture elements in a color space) is represented by Emax, vector quantization is performed till immediately before a quantization error in each character exceeds the maximum value Emax, and the S/N ratios of all of the characters are uniformed for each frame.

Further, if such quantization is performed, then the number of colors is decreased with a character which is moderate in variation in color. This is because, even if the number of colors decrease, a quantization error will not increased very much. Then, such quantization may result in production of characters wherein the number of colors is 3, 2 or 1.

In this manner, picture image data CHR(i) are compressed such that each character may include four or less colors.

Then, at step 83, those of the thus compressed picture image data CHR(i) are classified into 8 groups (such groups will be hereinafter referred to as "pallets") by collecting those characters which have similar colors to each other. In other words, the characters are classified such that each of them may belong to one of the 8 pallets.

Figure 4C:
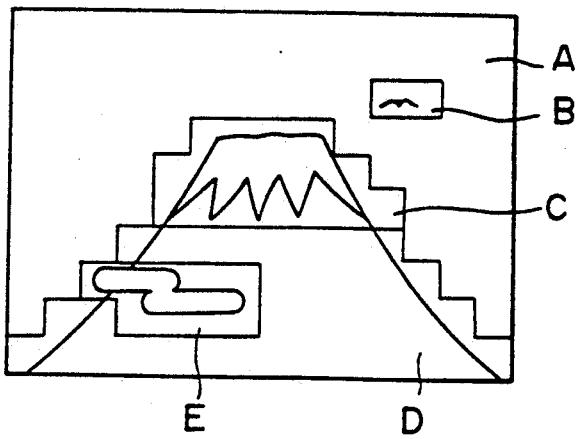

In this instance, the characters are only classified and not changed in order. Further, each pallet need not be a region of successive characters, but random characters may constitute a pallet. For example, when regions A to E in each of which the color tone is similar appear as shown in FIG. 4C, a pallet is constituted for each of the regions A to E.

In this manner, the picture image data CHR(i) are classified into 8 pallets PLT(0) to PLT(7) of picture image data.

Then at step 84, secondary vector quantization is performed for the data of the 8 pallets PLT(j) (j=0 to 7).

Such vector quantization involves, for each pallet, rounding of colors of picture elements of characters belonging to the pallet to one of 16 representative colors. In particular, even if representative colors of each character are four colors, the number of colors of a pallet which includes such characters sometimes exceeds 16 colors, and accordingly, if the number of colors in a pallet is greater than 16 colors, secondary vector quantization is performed, in a similar manner as in the case of the primary vector quantization, so that the number of colors in the pallet may be equal to 16, and resulted 16 colors are determined as new representative colors.

In this manner, picture image data of each pallet PLT(j) are quantized into color data of the 16 representative colors.

Subsequently at step 85, tables COL(0) to COL(7) for color number conversion are drawn up for each pallet from the picture image data of the pallet PLT(j) rounded individually into 16 colors. The tables COL(j) are conversion tables each having, for each pallet, color data (16-bit data) of the 16 representative colors and color numbers (0 to 15) designating such color numbers.

Then at step 86, the color number tables COL(j) are temporarily stored as record data COL.

Further at steps 91 and 92, picture image data rounded into 16 representative colors are converted, for each character, into index numbers.

In particular, as described above, the characters may include four, three, two colors or one color. Then, in case a character includes four or three colors as seen in FIG. 6A, if such an index table IND2 of original color numbers and index numbers (new color numbers) as shown, for example, in FIG. 6B is prepared, then colors of individual picture elements in the character can be represented by data DSP2 of index numbers as shown in FIG. 6C. Then, the index numbers in the tables IND2 and index data DSP2 can be represented by 2 bits.

Meanwhile, when a character includes 2 colors as seen in FIG. 7A, if such a table IND1 of original color numbers and index numbers as shown, for example, in FIG. 7B is prepared, then colors of individual picture elements in the character can be represented by data DSP1 of index numbers. Then, index numbers in the table IND1 and data DSP1 can be represented by 1 bit.

Figure 8:
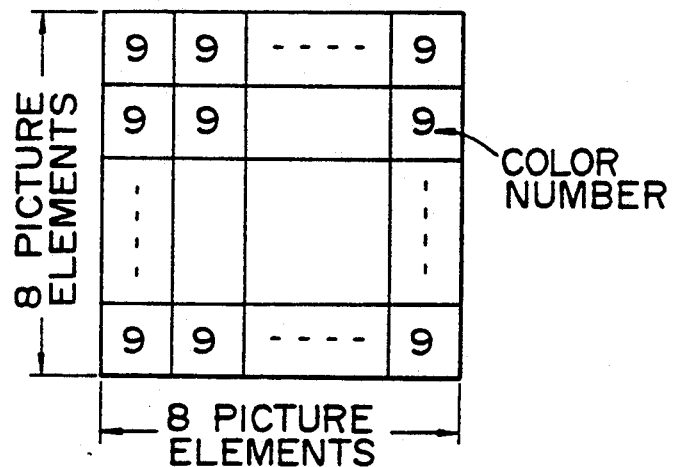
FIG. 8 is a diagrammatic view showing data of characters in a single-color mode.

Further, when a character includes a single color as shown in FIG. 8, the color of all of picture elements in the character can be represented only by the color number.

It is to be noted that, in the following description, a character including four or three colors (FIGS. 6A to 6C) will be hereinafter referred to as character MCH2 of the 2-bit mode; a character including two colors (FIGS. 7A to 7C) as character MCH1 of the 1-bit mode; and a character including a single color (FIG. 8) as a character MCH0 of the single color mode.

Thus, at step 91, for each pallet, picture element data rounded into 16 representative colors are converted, referring to the color number tables COL(j), into corresponding color numbers of the color number table COL(j) of the pallet (FIGS. 6A, 7A and 8), and then at step 92, color numbers of characters MCH2 of the 2-bit mode and characters MCH1 of the 1-bit mode are converted, referring to the index tables IND2 and IND1, into data DSP2 and DSP1 of index numbers (FIGS. 6C and 7C), respectively. It is to be noted that, as regards characters MCH0 of the single color mode, for the convenience of description, the color number of each of them is represented by index number data DSP0 (=one of 0 to 15).

Then at step 93 shown in FIG. 3, the index tables IND2 and IND1 are temporarily stored as record data IND.

Further, when decoding processing is taken into consideration, it can be executed at a higher rate if index number data DSP2 of characters MCH2 of the 2-bit mode, index number data DSP1 of characters MCH1 of the 1-bit mode and index number data DSP0 of characters MCH0 of the single color mode are individually collected. However, characters of the different modes are normally disposed in a picture image of one frame as shown, for example, in FIG. 9A. It is to be noted that, in FIGS. 9A and 9B, the mark ② denotes a character MCH2 of the 2-bit mode, ① denotes a character MCH1 of the 1-bit mode, and ⓪ denotes a character MCH0 of the single color mode.

Figure 9A:
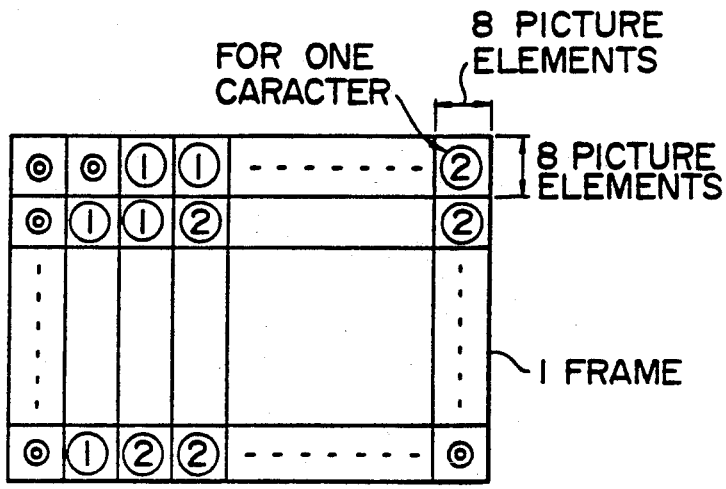
FIGS. 9A to 9C are diagrammatic views showing screen tables.
Figure 9B:
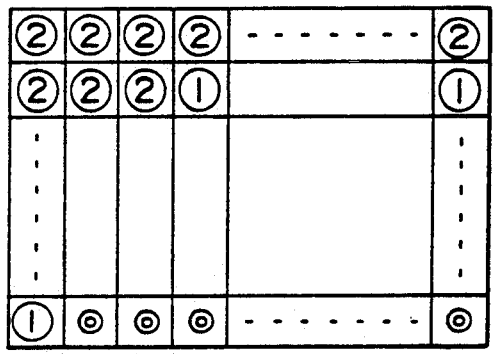

Thus, at step 94, sorting is executed so that index number data DSP2, DSP1 and DSP0 of each pallet are re-arranged into the order of, as shown in FIG. 9B, index number data DSP2 of characters MCH2 of the 2-bit modes, index number data DSP1 of characters MCH1 of the 1-bit mode and index number data DSP0 of characters MCH0 of the single color mode.

Then at step 95, of the results of the sorting at step 94, the index number data DSP2 of the characters MCH2 of the 2-bit mode and the index number data DSP1 of the characters MCH1 of the 1-bit mode are temporarily stored as record data DAT. The index number data DSP0 of the remaining characters of the single-color mode will be hereinafter described.

Further, while the index number data DSP2 and DSP1 of the record data DAT are obtained by sorting of the index number data DSP2, DSP1 and DSP0 and do not include information of the characters MCH0 of the single color mode (index number data DSP0), they do not correspond to original character positions in the one frame any more.

Therefore, a screen table SCR for re-arranging index number data DSP2 to DSP0 for one frame into the original order is formed at step 96. The screen table SCR is a map which indicates character positions at which characters after sorting (index number data DSP2, DSP1 and DSP0) have been arranged before such sorting, and includes, for each character, a character number C0 to C767 and a pallet number P0 to P7.

Figure 9C:
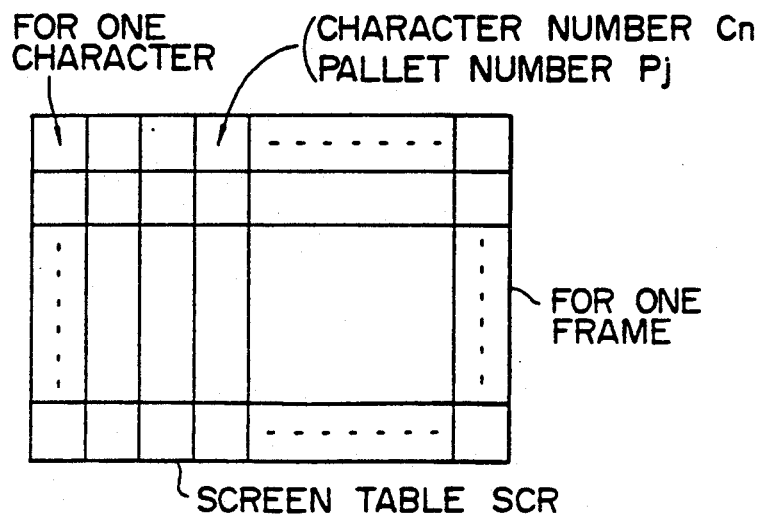
Figure 10:
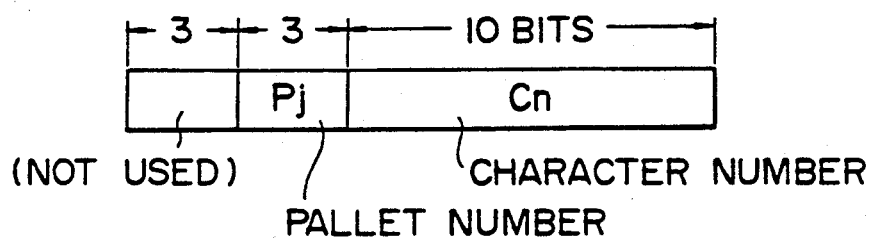
FIG. 10 is a diagrammatic illustration showing a structure of data in the screen tables.

In particular, as shown in FIG. 9C, a character number Cn (n=0 to 767) is 10-bit data which represent a position of a character before sorting in a frame by a consecutive number beginning with the left upper corner position of the screen shown. Meanwhile, a pallet number Pj is 3-bit data which represent that one of the 8 pallets PLT (j) in which the character is included.

Thus, in the screen table SCR, 2 bytes are allotted to one character, and 10 lower bits of them are allotted to a character number Cn while 3 upper bits are allotted to a pallet number Pj.

Further, at step 97, the values 0 to 15 of the character numbers Cn of the screen table SCR are allotted to characters MCH0 of the single color mode. In particular, in the table SCR, the character numbers Cn are shifted by 16 character number distances in the increasing direction, and the color numbers of characters MCH0 of the single color mode (index number data DSP0) are allotted to the character numbers C0 to C15 while original character numbers are allotted to the character numbers C16 to C783.

Then at step 98, the screen table SCR is temporarily stored as record data SCR.

In this manner, data COL for color number conversion, index number data DSP2 of characters MCH2 of the 2-bit mode and index tables IND2 for such index number data DSP2, index number data DSP1 of characters MCH1 of the 1-bit mode and index tables IND1 for the index number data DSP1, and a screen table SCR are produced for each one frame.

It is to be noted that, in this instance, the number N of index number data DSP2 of characters MCH2 of the 2-bit mode and index tables IND2 and the number M of index number data DSP1 of characters MCH1 of the 1-bit mode and index tables IND1 vary depending upon contents of a picture image and range $0 \leq N \leq 768$ and $0 \leq M \leq 768$, respectively. It is to be noted that the data DSP2, IND2, DSP1 and IND1 may be hereinafter referred to generally as data DAT.

Figure 11:
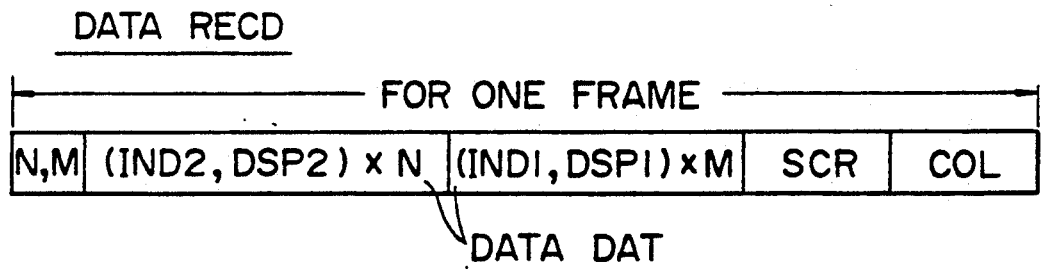
FIG. 11 is a diagrammatic illustration showing a format of record data.

The data COL, DAT and SCR are built up into and recorded as record data RECD of such a format as shown, for example, in FIG. 11.

In particular, referring to FIG. 11, the record data RECD include, at the top thereof, information indicating a number N of characters MCH2 of the 2-bit mode and another number M of characters MCH2 of the 1-bit mode and include, subsequently to the information, index tables IND2 of characters MCH2 of the 2-bit mode and index number data DSP2 for N characters. The record data RECD further include, subsequently to the data for the N characters, index tables IND1 of characters MCH1 of the 1-bit mode and index number data DSP1 for M characters and include, at the last positions, a screen table SCR and color number data COL in this order.

Then, the record data RECD are recorded onto a record medium such as, for example, a CD-ROM. In this instance, the record data RECD are recorded into a CD-ROM after encoding processing for the recording in the mode 1 such as addition of an error correction code has been executed therefor. Further, the CD-ROM may have a program prepared thereon for displaying or using picture images (record data RECD) recorded thereon.

Here, an amount of data per frame after data compression will be calculated.

In particular, since one frame includes 8 pallets each including 16 colors which are each represented by 16 bits (including one dummy bit), the total amount of color number data COL (color number tables COL (j)) of the one frame is given by 8 pallets × 16 colors × 16 bits = 256 bytes.

Meanwhile, since a screen table SCR includes 768 characters each constituted from 2 bytes, the total amount of data thereof is given by 2 bytes × 768 = 1,536 bytes.

Meanwhile, since an index table IND2 of characters MCH2 of the 2-bit mode is represented by 4 bits for the color numbers 0 to 15 and color numbers are required for four colors, the amount of data of the index table is given by 4 bits × 4 colors = 2 bytes.

Further, since index number data DSP2 include index numbers of 2 bits for one character, the amount of data is given by 2 bits × 8 picture elements × 8 picture elements = 16 bytes.

Accordingly, the amount of data of the characters MCH2 of the 2-bit mode is 18 bytes per character.

Further, since an index table IND1 of characters MCH1 of the 1-bit mode include 4 bits for the color numbers 0 to 15 for 2 colors, the amount of data thereof is given by 4 bits × 2 colors = 1 byte.

Further, since index number data DSP1 include an index number of 1 bit for one character, the amount of data thereof is given by 1 bit × 8 picture elements × 8 picture elements = 8 bytes.

Accordingly, the amount of data of the characters MCH1 of the 1-bit mode is 9 bytes per character.

Further, as regards characters MCH0 of the single color mode, picture element data of the characters are not transmitted.

Accordingly, if it is assumed that the ratio of characters MCH2, MCH1 and MCH0 of the three modes in one frame are given, for example, by 2-bit mode:1-bit mode:single color mode = 2:1:1
= 384:192:192
(characters)

then, the total amount of data is given by

| | |
|---|---|
| color number data COL | = 256 bytes |
| screen table SCR | = 1,536 bytes |
| characters MCH2 in 2-bit mode | = 1,536 bytes |
| characters MCH2 in 2-bit mode | = 18 bytes × 384 |
| | = 6,912 bytes |
| characters MCH1 in 1-bit mode | = 9 bytes × 192 |
| | = 1,728 bytes |
| total | = 10,432 bytes |

Thus, the total amount of data is about 10 kilobytes.

Then, since the transmission rate of a CD-ROM is 150 kilobytes/second, an animation can be recorded or reproduced at the rate of 15 frames/second.

In this manner, according to the data compressing method illustrated in FIGS. 2 to 11, since a picture image of each frame is hierarchically divided into small regions and then vector quantization is executed for picture image data of each hierarchic layer, a high compression ratio of picture image data can be achieved.

Further, when compressed picture image data are to be decoded, decoding processing can be executed only by referring to tables, and accordingly, a decoder of simplified construction can be used. Further, since a buffer memory of a large capacity is not required, a general-purpose DSP wherein the built-in RAM has a limited capacity can be employed for a decoder. Consequently, the cost for a decoder is low.

Besides, since compressing processing is executed without making use of a frame-correlation, even if an error occurs upon decoding, such error will complete in one frame and have no influence upon any of the succeeding frames.

Further, since a decoder circuit can be provided at a low cost and a CD-ROM can be employed as a record medium, the present invention can be applied effectively to software for a computer game machine.

Decoder Circuit

Figure 1:
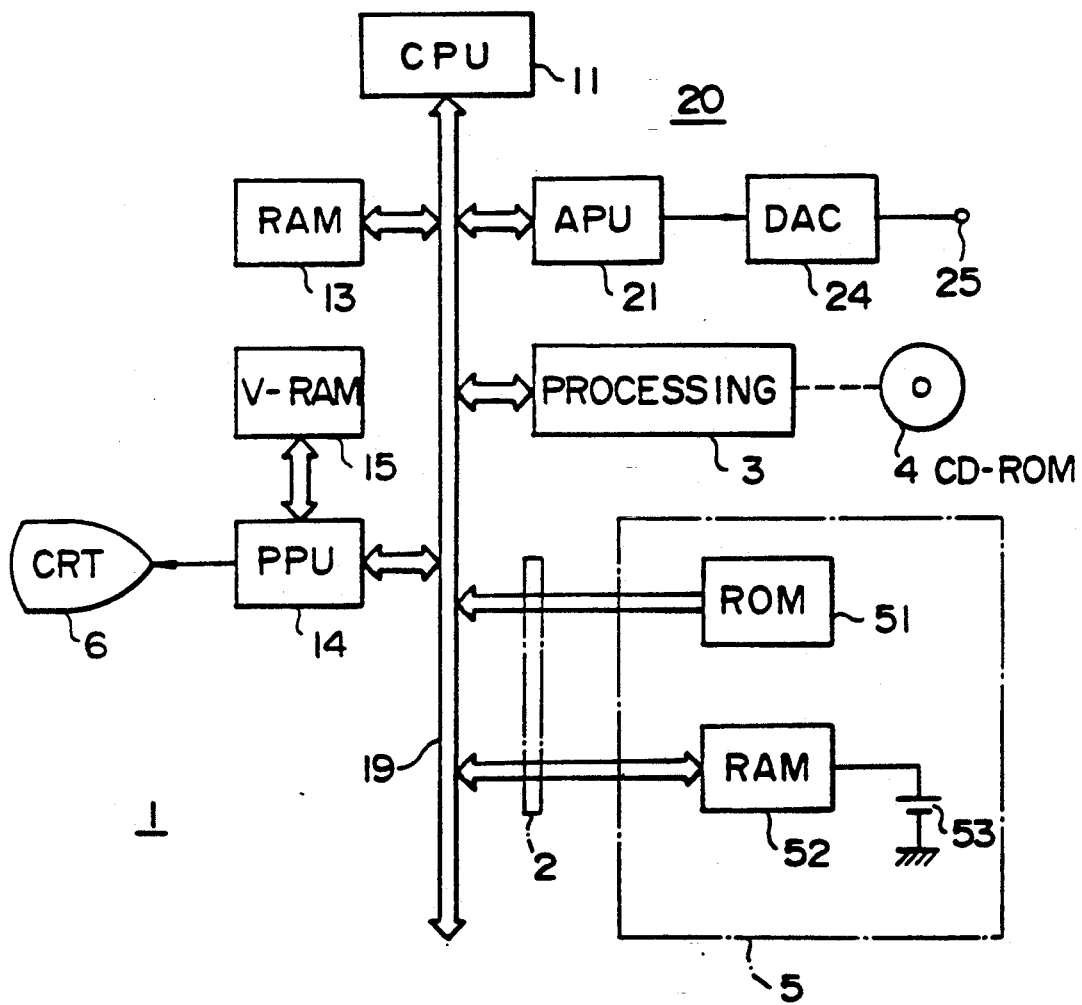
FIG. 1 is a block diagram showing a conventional microcomputer system applied to a game machine.

The following describes the basic construction and operation of a microcomputer system wherein such compressed picture image data RECD as described above are decoded back into original picture image data so that an animation may be displayed will be described with reference to FIG. 12. It is to be noted that the decoder circuit shown has somewhat common construction to that of the decoder circuit shown in FIG. 1.

Figure 12:
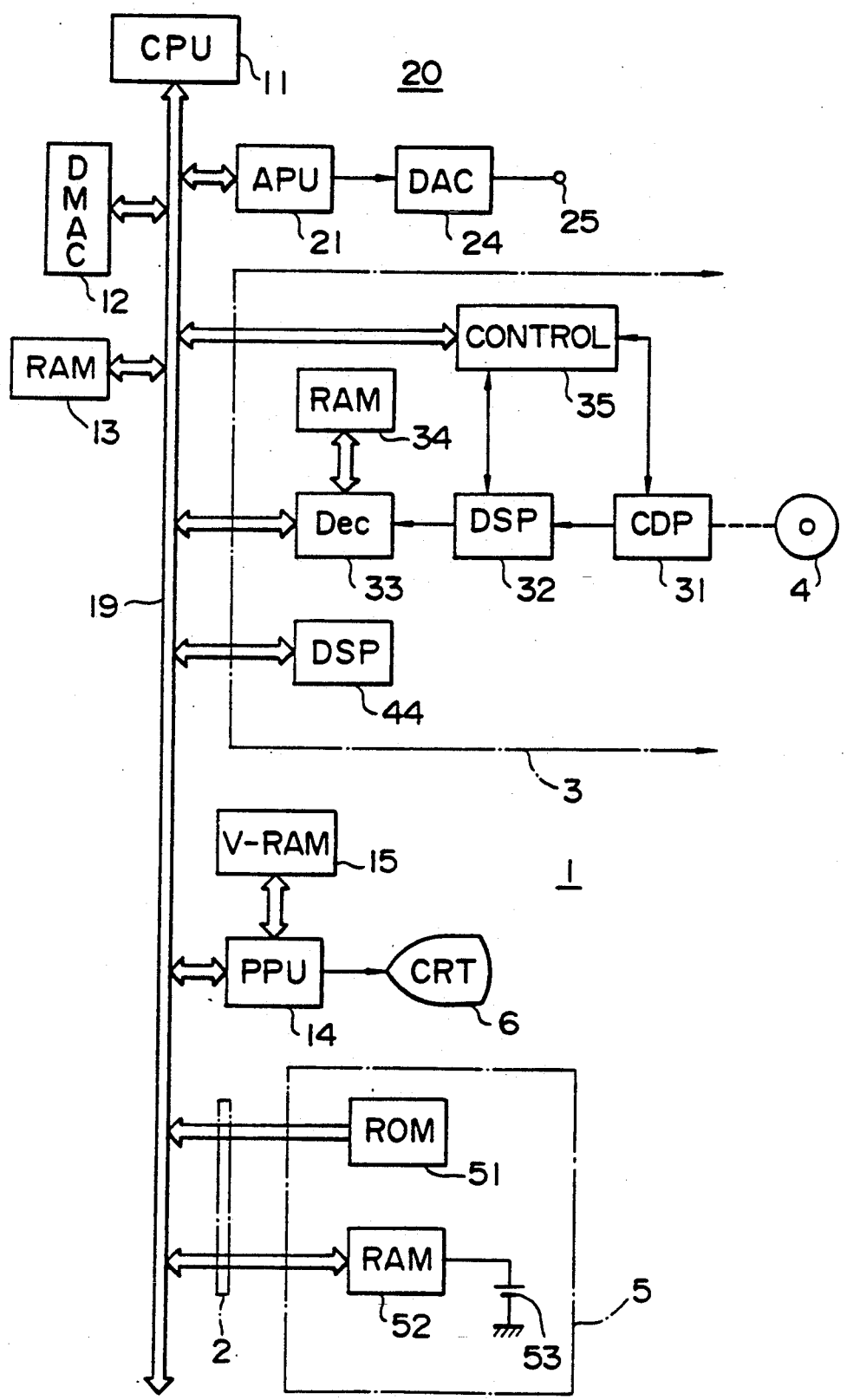
FIG. 12 is a block diagram showing a decoding circuit to which the present invention is applied.

The microcomputer system shown in FIG. 12 is applied to a game machine and includes a game machine body 1, a sub-processing section 3 for a CD-ROM 4, and a program cartridge 5.

The game machine body 1 includes a microcomputer including a CPU 11, a DMAC (DMA controller) 12, a main RAM 13 serving as a working area for the CPU 11, a PPU 14, and a video RAM 15. The circuits 11 to 14 are connected to a system bus 19, and the video RAM 15 and a CRT 6 are connected to the PPU 14.

In the present decoder circuit, the video RAM 15 has a pair of screen areas for 2 frames (2 screens), and while picture image data of one of the screen areas are read out by the PPU 14 in a synchronized relationship with vertical and horizontal scanning of the CRT display 6 so that they are displayed as a picture image on the display 6, picture image data for another picture image to be displayed subsequently are written into the other screen area of the video RAM 15. It is to be noted that part of the video RAM 15 serves as a working area for the PPU 14 so that it may be used as an area for color number tables COL(j) (area for pallets).

The game machine body 1 further includes a main processing section 20 for audio data including an APU 21 and a D/A converter 24 and having an audio output terminal 25. The APU 21 is connected to the bus 19 and also to the D/A converter 24 which is connected to the output terminal 25.

Meanwhile, the sub-processing section 3 is provided in order to allow use of a CD-ROM 4 and includes a CD player 31, a DSP 32, a CD-ROM decoder 33, a RAM 34 serving as a working area for the CD-ROM decoder 33, and a controller 35. The CD-ROM 4 has recorded thereon audio data, picture image data RECD, programs for encoding the picture image data RECD into original picture image data, programs of a game and an OS as described hereinabove.

The DSP 32 is provided to execute error correction for a reproduction signal of the CD player 31 and separate the reproduction signal into user data such as picture image data RECD and control data such as a track number. The controller 35 controls the player 31 in accordance with control data from the DSP 32 and instruction data from the CPU 11 to reproduce object data. The decoder 33 executes, when the reproduction signal of the player 31 is a reproduction signal of the CD-ROM 4 in the mode 1, such processing as error correction in the mode 1.

The sub-processing section 3 further includes a DSP 44. The DSP 44 is constituted from a general-purpose DSP but executes, in the sub-processing section 3, processing of picture image data. It is to be noted that, while the sub-processing section 3 is integrated with the game machine body 1 in the present microcomputer system, it may otherwise be of the adapter type to the game machine body 1.

The program cartridge 5 includes a ROM 51 and a RAM 52. The ROM 51 has required programs stored in advance therein, and the RAM 52 is used, for example, when a game being played is interrupted temporarily, to maintain various data regarding conditions of the game then until the game is resumed later. Thus, the RAM 52 is backed up by a battery 53.

When picture image data RECD of the CD-ROM 4 are displayed as an animation, the procedure of decoding processing for such picture image data RECD is such as follows:

A. to decode index number data DSP2 and/or DSP1 into color numbers referring to the index tables IND2 and/or IND1, respectively;

B. to decode such color numbers into picture element data of actual colors referring to the color number tables COL(j) (color number data COL); and C. to re-arrange such picture element data to original character positions referring to the screen table SCR.

Of the steps A to C described above, the step A is executed by the DSP 44 and the steps B and C are executed by the PPU 14.

(1) In particular, picture image data RECD for one frame are reproduced from the CD-ROM 4 by the CD player 31 and are supplied from the player 31 to the DSP 32 and then to the decoder 33 so that they may undergo suitable processing such as error correction. The picture image data RECD for which error correction has been executed are DMA transferred from the decoder 33 to the first buffer area of the RAM 13 by the DMAC 12.

(2) A program for decoding characters MCH2 of the 2-bit mode is loaded into the DSP 44.

(3) Of data IND2 and DSP2 of characters MCH2 of the 2-bit mode of the picture image data RECD DMA transferred to the first buffer area of the RAM 13, data for 8 characters beginning with the first one are DMA transferred to the DSP 44 by the DMAC 12.

(4) The step A described above is executed by the DSP 44 in accordance with the program loaded in the DSP 44 so that the index number data DSP2 DMA transferred to the DSP 44 are converted into color numbers (FIG. 6A) with reference to the index table IND2. As a result of such conversion, the index number data DSP2 for 8 characters (=16 bytes×8 data) are decoded into color numbers of 4 bits×8 picture elements×8 picture elements×8 data (=256 bytes).

(5) The thus decoded color numbers are DMA transferred to the second buffer area of the RAM 13 by the DMAC 12.

(6) After then, the steps (3) to (5) are repeated until all of the index number data DSP2 of the characters MCH2 of the 2-bit mode are decoded into color numbers and DMA transferred to the second buffer area of the RAM 13.

(7) All of the color numbers of the 2-bit mode DMA transferred to the second buffer area of the RAM 13 are then DMA transferred to the video RAM 15 by way of the PPU 14 by the DMAC 12 for a vertical blanking period of the CRT display 6.

(8) After completion of the step (7), a program for decoding characters MCH2 of the 1-bit mode is loaded into the DSP 44.

(9) Of data IND1 and DSP1 of characters MCH1 of the 1-bit mode of the picture image data RECD DMA transferred to the first buffer area of the RAM 13, data for 8 characters beginning with the first one are DMA transferred to the DSP 44 by the DMAC 12.

(10) The step A described above is executed by the DSP 44 in accordance with the program loaded in the DSP 44 so that the index number data DSP1 DMA transferred to the DSP 44 are converted into color numbers (FIG. 7A) with reference to the index table IND1. As a result of such conversion, the index number data DSP1 for 8 characters (=8 bytes×8 data) are decoded into color numbers of 4 bits×8 picture elements×8 picture elements×8 data (=256 bytes).

(11) The thus decoded color numbers are DMA transferred to the second buffer area of the RAM 13 by the DMAC 12.

(12) After then, the steps (9) to (11) are repeated until all of the index number data DSP1 of the characters MCH1 of the 1-bit mode are decoded into color numbers and DMA transferred to the second buffer area of the RAM 13.

(13) All of the color numbers of the 1-bit mode DMA transferred to the second buffer area of the RAM 13 are then DMA transferred to the video RAM 15 by way of the PPU 14 by the DMAC 12 for a vertical blanking period of the CRT display 6.

It is to be noted that the DMA transfer of color numbers of the 2-bit mode at the step (7) may alternatively be executed immediately prior to the step (13), that is, between the steps (12) and (13).

(14) After completion of the processing to the step (13), the screen table SCR of the picture image data RECD DMA transferred to the first buffer area of the RAM 13 is DMA transferred to the video RAM 15 by way of the PPU 14 by the DMAC 12 for a vertical blanking period of the CRT display 6.

(15) The color number data COL DMA transferred to the first buffer area of the RAM 13 are DMA transferred to the video RAM 15 by way of the PPU 14 by the DMAC for a horizontal blanking period of the CRT display 6.

(16) After the processing to the step (15) is completed, the PPU 14 executes the steps B and C described above on the real time basis. In particular, the color numbers processed at the steps (3) to (6) and (9) to (12) are decoded into picture element data of actual colors referring to the color number tables COL(j) (color number data COL), and are then written to addresses of the video RAM 15 corresponding to respective original character positions referring to the screen table SCR.

(17) After the picture element data for one frame are written into the video RAM 15 in this manner, the display area of the video RAM 15 is changed over so that the area thereof into which the picture element data have been written are rendered active to cause the screen thereof to be displayed on the display 6.

(18) The processing returns to the step (1) above so that the steps (1) to (17) described above will be repeated for each one frame.

Thus, picture image data reproduced from the CD-ROM 4 are processed like pipeline processing among the RAM 13, DSP 44 and PPU 14 and successively sent to the video RAM 15 as described above. Accordingly, a picture image based on the picture image data RECD of the CD-ROM 4 is displayed as an animation on the display 6.

PREVENTION OF OVERFLOW OF BUFFER MEMORY

While the first buffer area of the RAM 13 is used as a buffer memory for picture image data RECD reproduced from the CD-ROM 4, such picture image data RECD from the CD-ROM 4 are written into the first buffer area in the following manner in order to prevent an otherwise possible overflow of the first buffer area of the RAM 13.

In particular, picture image data RECD for one frame require 10 kilobytes or so as described above, which correspond to 5 sectors of the CD-ROM 4.

Figure 13:
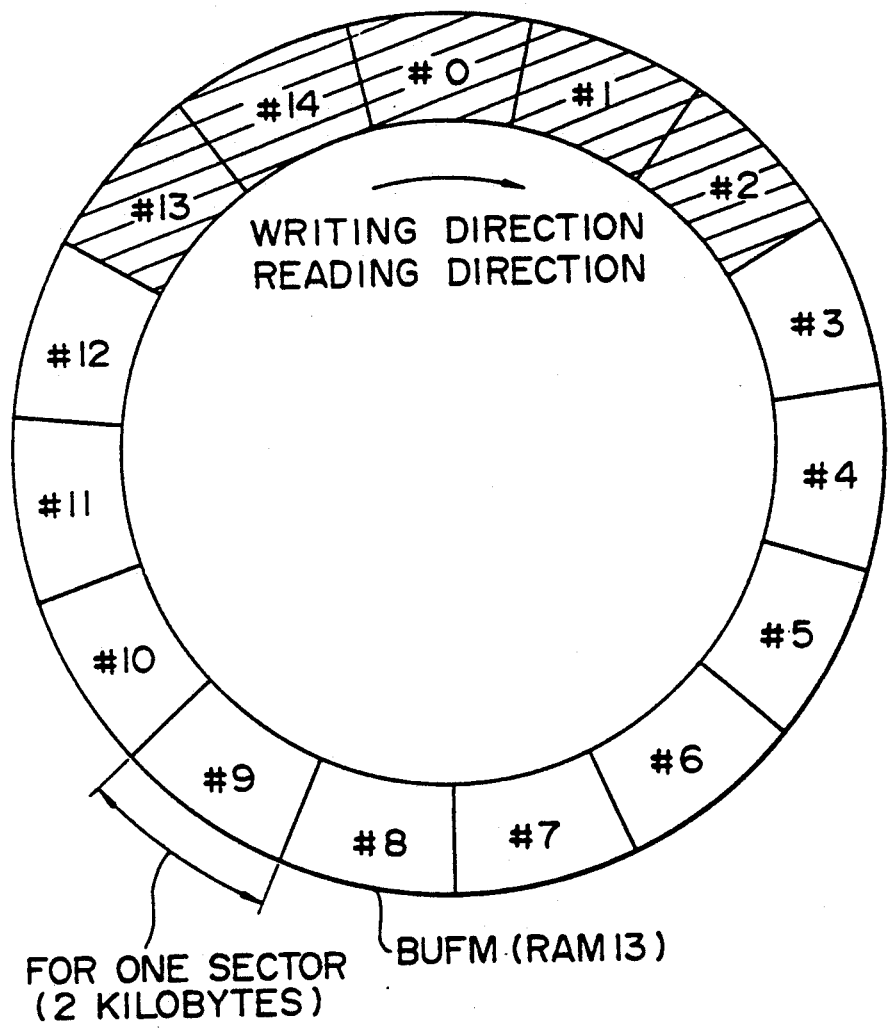
FIG. 13 is a diagrammatic view illustrating a manner of use of a memory of the decoding circuit of FIG. 12.

Thus, when the first buffer area of the RAM 13 is regarded as such a memory BUFM as shown in FIG. 13, the memory BUFM has a capacity, for example, for 15 sectors of the CD-ROM 4, that is, a capacity of 30 kilobytes ($=2$ kilobytes $\times 15$ sectors). It is to be noted that #0 to #14 in FIG. 13 indicate area numbers when the memory BUFM is divided into areas of 2 kilobytes.

Further, the memory BUFM is constituted as a ring buffer such that, when picture image data RECD for one frame are to be written into the memory BUFM, they are written in the order of addresses (in the order of the areas), and after they are written to the uppermost order address (#14), they are written to the lowermost order address (#0).

For example, when picture image data RECD of the Qth frame from the CD-ROM 4 are written into the memory BUFM beginning with the area #13, they are written in the order of the areas #13→#14→#0→#1→#2 as indicated by hatched lines in FIG. 13.

Then, when picture image data RECD of the next (Q+1)th frame from the CD-ROM 4 are to be written into the memory BUFM, it is first checked whether or not the fifth area #7 from the last area #2 in which the picture image data RECD of the Qth frame are written is empty, and if the area #7 is empty, then the picture image data RECD of the (Q+1)th frame are successively written into the memory BUFM beginning with the area #3 next to the area #2.

However, if it is determined, as a result of the checking whether or not the area #7 is empty, that the area #7 is not empty, the picture image data RECD of the (Q+1)th frame are not written into the memory BUFM but are abandoned.

In particular, it is assumed that, when picture image data RECD of the Qth frame from the CD-ROM are written into the memory BUFM, the last one of the picture image data RECD (last byte of data COL) is written into the Rth area #R of the areas #0 to #14 of the buffer memory BUFM (R is one of 0 to 14). Then, a. when picture image data RECD of the next (Q+1)th frame are to be written into the buffer memory BUFM, it is first checked whether or not picture image data RECD which are not processed as yet remain in a succeeding area of the buffer memory BUFM spaced by one frame distance from the area #R, that is, the area #(R+5) succeeding for 5 sectors in average to the area #R (in case R+5≧14, R+5 is set to a value obtained by subtraction of 15 therefrom, which similarly applies to the following description).

b. If the result of the checking proves that there remain no non-processed picture image data RECD in the area #(R+5), then the picture image data RECD of the (Q+1)th frame are successively written into the buffer memory BUFM beginning with the area #(R+1).

c. On the contrary if the result of the checking proves that there remain non-processed picture image data RECD in the area #(R+5), the picture image data RECD of the (Q+1)th frame are abandoned and are not written into the memory BUFM.

d. After then, similar processing will be repeated.

It is to be noted that checking at the step a is executed by the CPU 11, and writing or abandoning of picture image data RECD at the step b or c is executed by the DMAC in accordance with an instruction from the CPU 11.

Further, checking at the step a can be realized by means of flags. In particular, flags are prepared individually for the areas #0 to #14, and when new picture image data RECD (for one sector) are written into an area, then a corresponding one of the flags is set, but when the picture image data RECD are sent to the DSP 44 after then, the corresponding flag is reset. Thus, if a flag is in a set state, then a corresponding area is occupied and not empty, but if the flat is in a reset state, then the corresponding area is empty.

With such construction as described above, even if the decoding rate at the components including the DSP 44 and so forth is lower than the reproducing rate of picture image data RECD from the CD-ROM 4, the buffer memory BUFM will not overflow at all, and the picture image data RECD can be decoded correctly into original picture image data.

Besides, in this instance, since the buffer memory BUFM must only have a capacity for compressed picture image data RECD for several frames, a buffer memory of a low cost can be used as the buffer memory BUFM.

Furthermore, since the number of frames per second of an animation displayed on the display 6 depends upon the reproducing rate of picture image data RECD from the CD-ROM 4, the reproducing rate of an animation is not varied by a performance of the decoder circuit.

In addition, since it is checked, when it is to be checked whether or not there is an empty space into which new picture image data RECD can be written, whether or not there is an empty space for one frame, processing is simple.

In particular, when it is to be checked whether or not there is an empty space into which new picture image data RECD can be written, if it is checked for each one area whether or not there is an empty space and then, when there is an empty space, new picture image data RECD for one sector are written into the area, then when it is found during writing of the picture image data RECD of one frame that there is no more empty space, an instruction to make the data already written invalid must be transmitted to the components including the DSP 44 and so forth and such components must execute such instruction, which will make processing complicated.

According to the present invention, however, since it is checked, when it is to be checked whether or not the buffer memory BUFM has an empty space into which new picture image data RECD can be written, whether or not there is a space for one frame, processing when there is no such empty space is very simple.

POSSIBLE ALTERNATIVES

It is to be noted that, while, in the embodiment described above, color numbers are sorted into characters MCH2, MCH1 and MCH0 of the different modes after they are converted into index numbers in order to simplify the description, such color numbers may alternatively be converted into index numbers after sorting thereof.

Further, while, in the embodiment described above, characters MCH2, MCH1 and MCH0 are divided, after primary vector conversion thereof, into pallets and secondary quantization is executed for such pallets, it is otherwise possible to first divide picture image data into characters and further into pallets, then execute primary vector quantization for each pallet to round colors of picture elements in the pallet into 16 colors and execute secondary vector quantization for each character to compress the colors of the picture elements in the character into colors equal to or less than four colors.

Accordingly, when picture image data RECD reproduced from a CD-ROM 4 are to be written into the buffer memory BUFM, it is checked whether or not the buffer memory BUFM has an empty space into which such picture image data RECD for one frame can be written, and if the buffer memory BUFM has such empty space, then the picture image data RECD are written into the buffer memory BUFM, but on the contrary if the buffer memory BUFM has no such empty space, the picture image data RECD are abandoned. Consequently, even if the decoding rate at the components including the DSP 44 and so forth is lower than the reproducing rate of picture image data RECD from the CD-ROM 4, the buffer memory BUFM will not overflow and the picture image data RECD can be decoded correctly into original picture image data.

Further, the compressed data RECD have a variable length and the time required for decoding of the picture image data RECD is varied by contents of a picture image, but a programmer need not program taking such time required for decoding into consideration, and accordingly, the burden to the programmer is reduced.

Having now fully described the invention, it will be apparent to one of ordinary skill in the art that many changes and modifications can be made thereto without departing from the spirit and scope of the invention as set forth herein.

What is claimed is:

1. A method of decoding input compressed picture image data, comprising the steps of:
   receiving input compressed picture image data;
   checking whether or not a buffer memory having a capacity greater than an amount of such input compressed picture image data for one frame has an empty space into which such input compressed picture image data for one frame can be written;
   writing, when the checking proves that said buffer memory has such empty space, the input compressed picture image data for one frame into said buffer memory; and
   decoding the picture image data in said buffer memory into original picture image data; but
   abandoning, when the checking proves that said buffer memory has no such empty space, the input compressed picture image data for one frame.

2. A method of decoding compressed picture image data, comprising the steps of:
   reproducing compressed picture image data from a CD-ROM;
   checking whether or not a buffer memory having a capacity greater than an amount of such compressed picture image data from the CD-ROM for one frame has an empty space into which such compressed picture image data from the CD-ROM for one frame can be written;
   writing, when the checking proves that said buffer memory has such empty space, the compressed picture image data from the CD-ROM for one frame into said buffer memory; and
   decoding the picture image data in said buffer memory into original picture image data; but
   abandoning, when the checking proves that said buffer memory has no such empty space, the compressed picture image data from the CD-ROM for one frame.

3. A decoder circuit for decoding compressed picture image data into original picture image data comprising:

a buffer memory having a capacity greater than an amount of predetermined input compressed picture image data for one frame;

checking means for checking whether or not said buffer memory has an empty space into which such input compressed picture image data for one frame can be written;

controlling means for writing, when said checking means determines that said buffer memory has such empty space, the input compressed picture image data for one frame into said buffer memory, but abandoning, when said checking means determines that said buffer memory has no such empty space, the input compressed picture image data for one frame; and decoding means for decoding the picture image data in said buffer memory into original picture image data.

4. A decoder circuit for decoding compressed picture image data into original picture image data, comprising:

means for reproducing compressed picture image data from a CD-ROM;

a buffer memory having a capacity greater than an amount of such compressed picture image data for one frame;

checking means for checking whether or not said buffer memory has an empty space into which such compressed picture image data from said reproducing means for one frame can be written;

controlling means for writing, when said checking means determines that said buffer memory has such empty space, the compressed picture image data from said reproducing means for one frame into said buffer memory, but abandoning, when said checking means determines that said buffer memory has no such empty space, the input compressed picture image data from said reproducing means for one frame; and decoding means for decoding the picture image data in said buffer memory into original picture image data.

* * * * *